(12) United States Patent
Jang

(10) Patent No.: US 10,500,976 B2
(45) Date of Patent: Dec. 10, 2019

(54) METHOD FOR CONTROLLING WIRELESS CHARGING OF ELECTRIC VEHICLE, AND APPARATUS USING THE SAME

(71) Applicants: Hyundai Motor Company, Seoul (KR); Kia Motors Corporation, Seoul (KR)

(72) Inventor: Jin Su Jang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/051,786

(22) Filed: Aug. 1, 2018

(65) Prior Publication Data
US 2019/0039465 A1 Feb. 7, 2019

(30) Foreign Application Priority Data

Aug. 7, 2017 (KR) .......... 10-2017-0099815
Jun. 7, 2018 (KR) .......... 10-2018-0065625

(51) Int. Cl.
*B60L 53/12* (2019.01)
*B60L 53/31* (2019.01)
*B60L 53/66* (2019.01)

(52) U.S. Cl.
CPC .......... *B60L 53/12* (2019.02); *B60L 53/31* (2019.02); *B60L 53/665* (2019.02); *B60L 2230/16* (2013.01)

(58) Field of Classification Search
CPC .... B60L 53/12; B60L 53/665; B60L 2230/16; B60L 53/31

USPC ......................................... 320/108
See application file for complete search history.

(56) References Cited

U.S. PATENT DOCUMENTS

| | | | | |
|---|---|---|---|---|
| 5,317,691 A | * | 5/1994 | Traeger | B60R 11/02 709/250 |
| 5,978,569 A | * | 11/1999 | Traeger | B60R 11/02 709/232 |
| 9,348,381 B2 | * | 5/2016 | Khoo | G06F 1/26 |
| 2011/0285345 A1 | * | 11/2011 | Kawai | B60L 53/11 320/107 |
| 2013/0093393 A1 | * | 4/2013 | Shimotani | B60L 3/12 320/109 |
| 2014/0266004 A1 | * | 9/2014 | Andrews, Jr. | B60L 53/55 320/104 |
| 2015/0084587 A1 | * | 3/2015 | Kato | H02J 50/40 320/108 |

* cited by examiner

*Primary Examiner* — M Baye Diao
(74) *Attorney, Agent, or Firm* — Mintz Levin Cohn Ferris Glovsky and Popeo, P.C.; Peter F. Corless

(57) ABSTRACT

A wireless charging control method performed by a power supply apparatus including at least one charging pad configured to supply power wirelessly to an EV may include: initializing a communication link with the EV; transmitting information relating to the at least one charging pad to the EV; receiving information indicating a departure time when the EV leaves a charging station; transmitting at least one of information indicating an output power of the at least one charging pad and information indicating a charging fee of the at least one charging pad; receiving scheduling information of the EV from the EV; and supplying power wirelessly to the EV through the at least one charging pad according to the scheduling information.

20 Claims, 21 Drawing Sheets

| | | ns6:Parameter | | |
|---|---|---|---|---|
| | | ns6:Parameter (7) | ◇ns6:intValue | ◇ns6:shortValue |
| | | = ns6:Name | | |
| | | 1 WPTSupplyDeviceID | 1 | |
| | | 2 WPTType | | 1 |
| | | 3 WPTPowerClass | | 1 |
| | | 4 MinPower | 0 | |
| | | 5 MaxPower | 3000 | |
| | | 6 PairingMethod | | 1 |
| | | 7 ZGapClass | | 1 |
| | | ns6:Parameter (7) | ◇ns6:intValue | ◇ns6:shortValue |
| | | = ns6:Name | | |
| | | 1 WPTSupplyDeviceID | 2 | |
| | | 2 WPTType | | 3 |
| | | 3 WPTPowerClass | | 4 |
| | | 4 MinPower | 0 | |
| | | 5 MaxPower | 9000 | |
| | | 6 PairingMethod | | 2 |
| | | 7 ZGapClass | | 2 | ns5:ServiceDetailRes
◇ ns5:ResponseC... OK
◇ ns5:ServiceID  4
▲ ns5:ServiceParameterList
  ▲ ns6:ParameterSet (2)
    ◇ ns6:ParameterS... ◇ ns6:Parameter
    1  1
    2  2

METHOD FOR CONTROLLING WIRELESS CHARGING OF ELECTRIC VEHICLE, AND APPARATUS USING THE SAME

CROSS-REFERENCE TO RELATED APPLICATIONS

The present application claims the benefit of priority to Korean Patent Application No. 10-2017-0099815, filed on Aug. 7, 2017 in the Korean Intellectual Property Office (KIPO), and Korean Patent Application No. 10-2018-0065625, filed on Jun. 7, 2018 in the KIPO, the entire contents of which are incorporated herein by reference.

TECHNICAL FIELD

The present disclosure relates to a method for controlling wireless charging and an apparatus using the same, a method for controlling wireless charging for an electric vehicle (EV), and an apparatus using the same, and more specifically, to a method for optimally controlling wireless charging based on a power supply capacity and a charging fee variation of a charging station, a power supply apparatus using the same, a method for controlling wireless charging for an EV, and a charging control apparatus using the same.

BACKGROUND

An electric vehicle (EV) charging system may be defined as a system for charging a high-voltage battery mounted in an EV using power of an energy storage device (e.g., a battery) or a power grid of a commercial power source. The EV charging system may have various forms according to the type of EV. For example, the EV charging system may be classified into a conductive-type using a charging cable and a non-contact wireless power transfer (WPT) type (also referred to as an "inductive-type").

However, in case that a plurality of wireless charging pads are connected to a single charger in the EV charging station, there may be a problem in that a plurality of EVs cannot be wirelessly charged simultaneously due to the limited output of the charger.

SUMMARY

Embodiments of the present disclosure provide a wireless charging control method based on a power supply capacity and a charging fee variation of a charging station. Embodiments of the present disclosure also provide a power supply apparatus using the wireless charging control method.

Embodiments of the present disclosure also provide a wireless charging control method of an EV, which controls wireless charging based on a power supply capacity and a charging fee variation of a charging station. Embodiments of the present disclosure also provide a wireless charging control apparatus using the wireless charging control method.

According to embodiments of the present disclosure, a wireless charging control method performed by a power supply apparatus including at least one charging pad configured to supply power to an EV may include: initializing a communication link with the EV; transmitting information relating to the at least one charging pad to the EV; receiving information indicating a departure time when the EV leaves a charging station; transmitting at least one of information indicating an output power of the at least one charging pad and information indicating a charging fee of the at least one charging pad; receiving scheduling information of the EV from the EV; and supplying power wirelessly to the EV through the at least one charging pad according to the scheduling information.

The wireless charging control method may further include exchanging wireless charging related messages between the EV and the power supply apparatus according to International Organization for Standardization (ISO) 15118.

The information relating to the at least one charging pad may be included in a ServiceDetailRes message transmitted to the EV.

The at least one of the information indicating the output power and the information indicating the charging fee may be included in a ChargeParameterDiscoveryRes message.

The information indicating the output power or the information indicating the charging fee may include an indication of at least one of a power output start time, a maximum output power, a billing start time, and a price level of each of the at least one charging pad.

The scheduling information may be included in a PowerDeliveryReq message received from the EV.

The scheduling information may include an indication of at least one of a charging start time, a maximum input power, and a charging end time of the EV.

The wireless charging control method may further comprise performing a procedure for alignment and pairing between a reception pad of the EV and the at least one charging pad to perform wireless power transfer to the EV.

The information indicating the departure time may be included in a ChargeParameterDiscoveryReq message.

The wireless charging control method may further comprise transmitting a renegotiation request to the EV when a surplus power of the power supply apparatus becomes available during the supplying of the power to the EV.

The renegotiation request may be included in a PowerDeliveryRes message transmitted by the power supply apparatus.

Furthermore, in accordance with embodiments of the present disclosure, a wireless charging control method performed by an EV configured to receive power wirelessly from a power supply apparatus including at least one charging pad may include: initializing a communication link with the power supply apparatus; receiving information relating to the at least one charging pad from the power supply apparatus; transmitting information indicating a departure time when the EV leaves a charging station; receiving at least one of information indicating an output power of the at least one charging pad and information indicating a charging fee of the at least one charging pad from the power supply apparatus; performing a scheduling operation using at least one of the information indicating the output power and the information indicating the charging fee; transmitting scheduling information to the power supply apparatus; and receiving power wirelessly from the at least one charging pad according to the scheduling information.

The wireless charging control method may further include exchanging wireless charging related messages between the EV and the power supply apparatus according to International Organization for Standardization (ISO) 15118.

The information relating to the at least one charging pad may be included in a ServiceDetailRes message received from the power supply apparatus.

The at least one of the information indicating the output power and the information indicating the charging fee may be included in a ChargeParameterDiscoveryRes message received from the power supply apparatus.

The scheduling information may be included in a PowerDeliveryReq message transmitted to the power supply apparatus.

Furthermore, in accordance with embodiments of the present disclosure, a power supply apparatus including at least one charging pad configured to supply power wirelessly to an electric vehicle (EV), at least one processor, and a memory storing at least one instruction executable by the at least one processor, which when executed causing the at least one processor to: initialize a communication link with the power supply apparatus; transmit information relating to the at least one charging pad to the EV; receive information indicating a departure time when the EV leaves a charging station; transmit at least one of information indicating an output power of the at least one charging pad and information indicating a charging fee of the at least one charging pad; receive scheduling information of the EV from the EV; and supply power wirelessly to the EV through the at least one charging pad according to the scheduling information.

The EV and the power supply apparatus may exchange wireless charging related messages according to International Organization for Standardization (ISO) 15118.

The information relating to the at least one charging pad is included in a ServiceDetailRes message transmitted to the EV.

The at least one of the information indicating the output power and the information indicating the charging fee may be included in a ChargeParameterDiscoveryRes message transmitted to the EV.

According to the embodiments of the present disclosure, it possible to perform wireless charge scheduling for the EV based on the output powers of all the charging pads over time in a charging station with a limited power supply capacity. Moreover, it is possible to ensure interoperability between the charging pad and the EV when another EV leaves the charging station.

BRIEF DESCRIPTION OF DRAWINGS

Embodiments of the present disclosure will become more apparent by describing in detail embodiments of the present disclosure with reference to the accompanying drawings, in which:

FIG. 3 is a diagram illustrating an example of a schema of a charging pad related information message according to embodiments of the present disclosure;

Figure 1A:
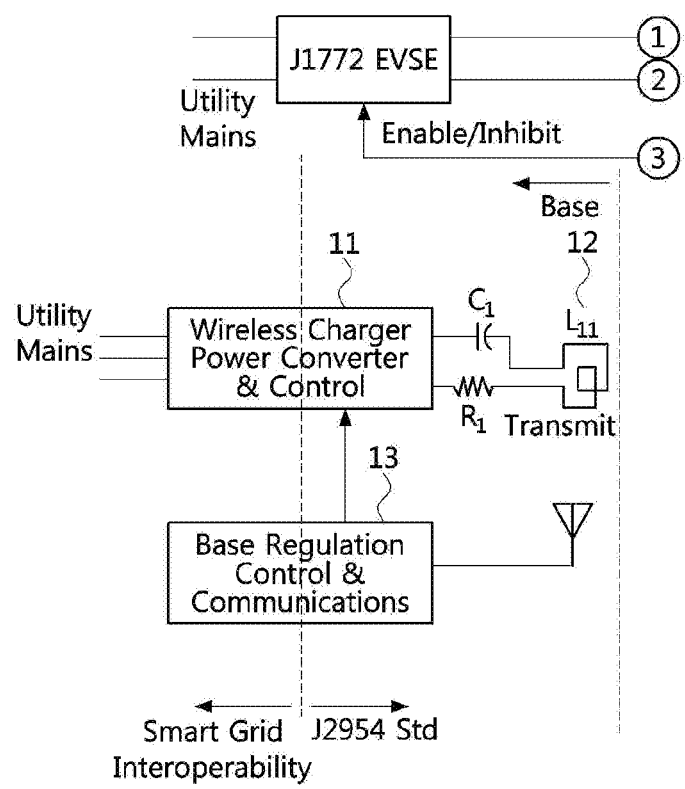
FIGS. 1A and 1B are conceptual diagrams illustrating an example of a WPT system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

For the purpose of the present disclosure, an EV charging system may be defined as a system for charging a high-voltage battery mounted on an EV by using power of an energy storage device or a power grid of a commercial power source. Such the EV charging system may have various forms according to the type of EV. For example, the EV charging system may be classified into a conductive-type using a charging cable and a non-contact wireless power transfer (WPT) type (also referred to as an "inductive-type"). A power source may include a residential or public electrical service, a generator utilizing vehicle-mounted fuel, or the like.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the controller in conjunction with one or more other components, as would be appreciated by a person of ordinary skill in the art.

According to embodiments of the present disclosure, a light load driving or light load operation may include, for example, charging a high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

Figure 1B:
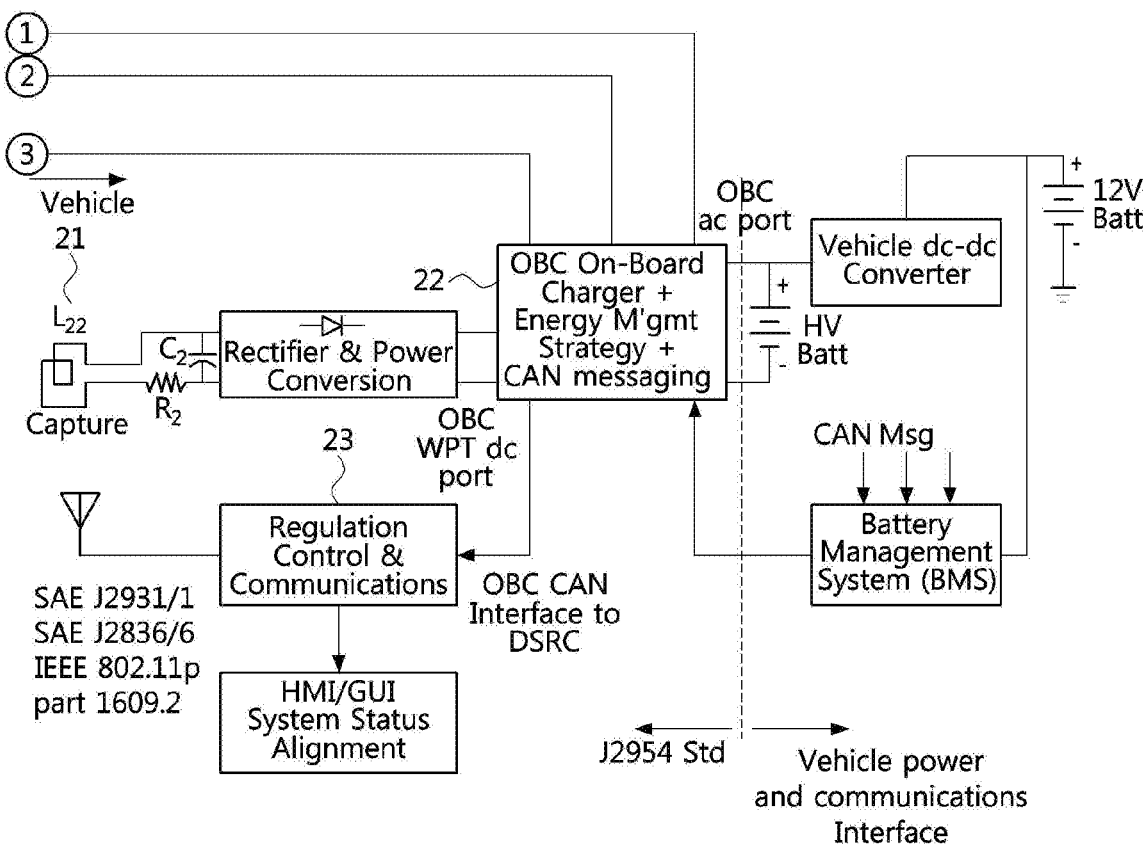

FIGS. 1A and 1B are conceptual diagrams illustrating an example of a WPT system.

As described above, an EV charging system may include a conductive charging system using a charging cable and a contact-less WPT system, but may not be limited thereto. The EV charging system may be defined as a system for charging a high-voltage battery mounted on an EV using power of an energy storage device or a power grid of a commercial power source. The EV charging system may have various forms according to the type of EV.

The SAE TIR J2954, a leading standard for the EV wireless charging, establishes guidelines that define interoperability, electromagnetic compatibility, minimum performance, safety, and acceptance criteria for testing for wireless charging of light-duty EVs and PEVs.

According to the SAE TIR J2954, referring to FIGS. 1A and 1B, a WPT system (also referred to herein as an "EV WPT system") may comprise a utility interface, a high frequency power converter, coupled coils, a rectifier, a filter, an optional regulator, and communication devices between a vehicle energy charge/store system and the power converter connected to the utility. The utility interface may be similar to a traditional EVSE connection for single-phase or three-phase AC power.

The EV WPT system may roughly comprise three blocks. The first block may comprise a GA coil 12, a power converter 11 connected to the grid, and a communication module 13 having a communication link with the vehicle system. The second block may comprise a VA coil 21 having rectifying and filtering elements, a charging control electronic device 22 for regulation, safety, and shutdown, and a communication module 23 having a communication link with the charging station side. The third block may comprise a secondary energy storage system, a battery management system (BMS), and an in-vehicle communication (e.g., CAN, LIN, etc.) module required for exchanging information indicating a battery state-of-charge (SOC) and a charging rate, and other necessary information.

Figure 2A:
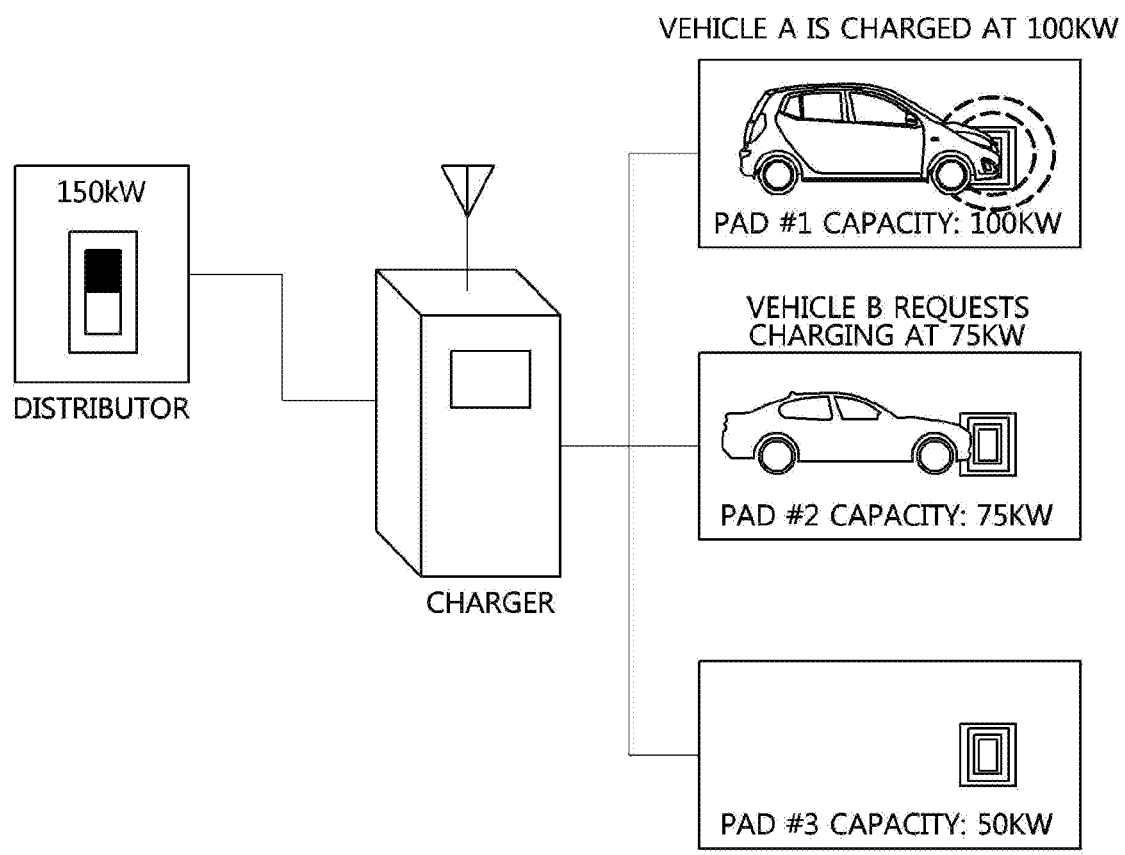
FIGS. 2A and 2B are diagrams illustrating a situation in which multiple EVs are being simultaneously charged in a conventional EV charging station.
Figure 2B:
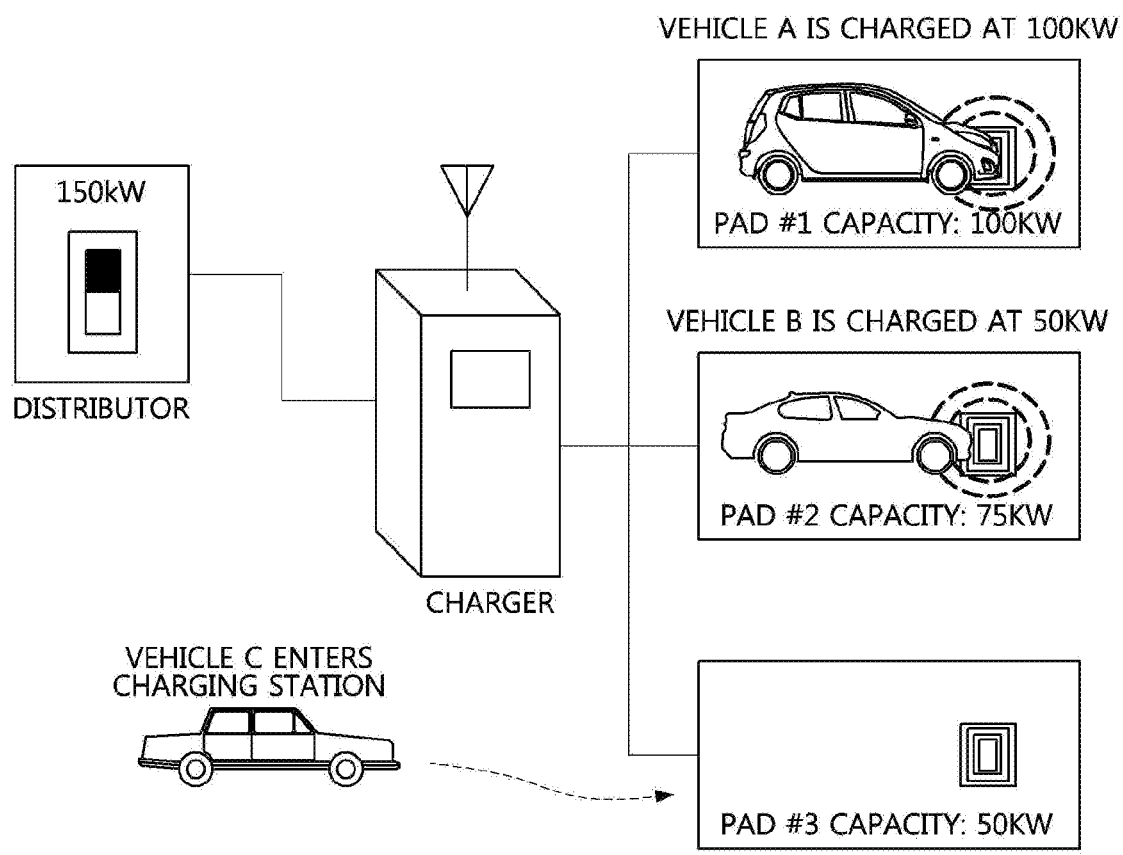

FIGS. 2A and 2B are diagrams illustrating a situation in which multiple EVs are being simultaneously charged in a conventional EV charging station.

For example, as shown in FIG. 2A, if a vehicle B requests charging at 75 kW while a charger having a total output of 150 kW performs WPT to a vehicle A at 100 kW, the charger can supply only a power of 50 kW to the vehicle B. In this situation, if a new vehicle C enters the charging station and requests charging, as shown in FIG. 2B, since the charger can no longer supply any power, the vehicle C may not proceed with charging even though the charging station has an idle charging pad.

In this case, in order to schedule the charging to the vehicle C by predicting when the power is available at the charger, time points at which the vehicle A or the vehicle B finishes charging should be identified. Thus, a charging profile of the charger and the charging pads that reflects charging schedules of the existing vehicles may be required. Such a situation may occur more frequently in the late night hours when a low charging fee is applied or in places where charging demands increase, and when considering together with charging scheduling functions of the respective vehicles, the situation may become more complicated.

As described above, when a plurality of wireless charging pads are connected to one charger in an EV charging station, a plurality of vehicles may not simultaneously perform charging due to the output limitation of the charger.

FIG. 3 is a diagram illustrating an example of a schema of a charging pad related information message according to embodiments of the present disclosure.

For example, FIG. 3 illustrates an example of a schema of a 'ServiceDetailRes' message according to the ISO 15118 standard. The ISO 15118 defines transmission and reception messages and charging sequences between an EV and a charger for wireless charging of the EV. Specifically, the ISO 15118 standardizes communications between an EVCC of the EV and an SECC of the charger. Accordingly, the ISO 15118 standard specifies various service scenarios to which authentication and verification of an EV charging service, start or stop of the wireless charging, or the like are applied, and defines various messages for functions such as fine positioning, alignment check, pairing, power demand, and the like.

With respect to the wireless charging sequence associated with these messages, the EVCC of the vehicle at the time of entry into the charging station may set up mutual communications with the SECC of the charger, and may perform an authentication procedure for the wireless charging. At this time, the EVCC may receive the ServiceDetailRes message 3000 as shown in FIG. 3 from the SECC to confirm basic information of all the charging pads (also referred to herein as "charging pad related information") in the charging station. The information of all the charging pads in the charging station may be transmitted to the EV through the message set as shown in FIG. 3.

When the user or the driver selects a charging pad based on the charging pad related information received from the charging station, parking of the EV may be completed through a fine positioning scheme supported by the charging pad. After the parking of the EV is completed, an alignment check and a pairing may be performed between the EV and the charging pad.

According to embodiments of the present disclosure, in the case that there are a plurality of charging pads in one charging station of an EV charging station having a limited power supply capacity, the charging pad related information including charging scheduling information of other EVs in the charging station may be used for scheduling of a newly entered EV.

Figure 4A:
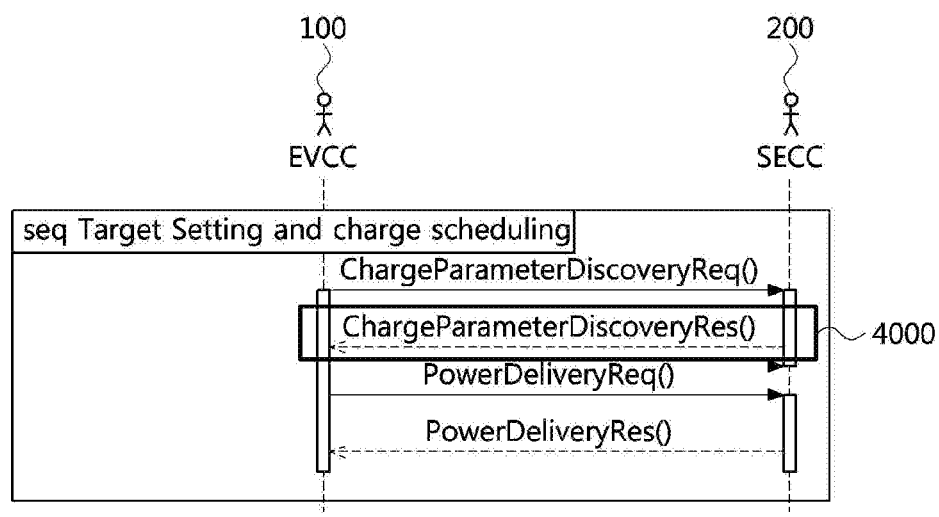
FIGS. 4A and 4B are diagrams illustrating a message including information indicating a maximum output power and a charging fee of a charger.
Figure 4B:
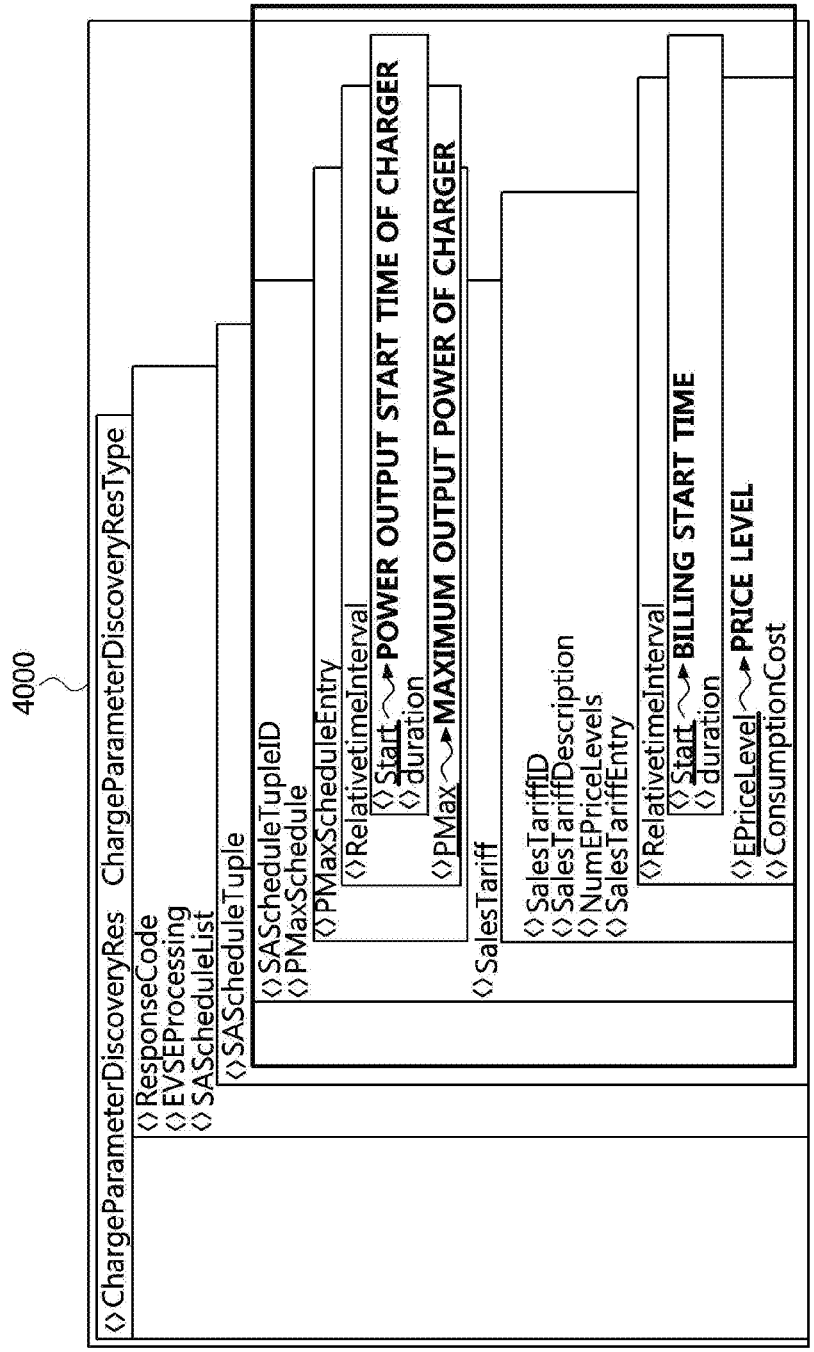

FIGS. 4A and 4B are diagrams illustrating a message including information indicating a maximum output power and a charging fee of a charger.

In order to perform the WPT, an EV and a charger (or a "power supply apparatus") may exchange messages with each other, and each pair of the messages may comprise a request message transmitted by the EV to the charger and a response message transmitted by the charger to the EV.

After the alignment check and pairing described above, messages for charging scheduling may be exchanged between an EVCC 100 of the EV and a SECC 200 of the charger. Referring to FIGS. 4A and 4B, messages exchanged between the EVCC 100 of the vehicle and the SECC 200 of the charger may be a pair of 'ChargeParameterDiscovery' messages. The ChargeParameterDiscovery messages may be messages for the EV and the charger to exchange their status and configuration before power is actually transferred therebetween.

Specifically, a 'ChargeParameterDiscoveryReq' message may include status information (i.e., EV Status) such as a current energy reserve of the EV, a power output start time of the charger, a maximum output power of the charger, a maximum acceptable current, power, voltage, and EV energy capacity, or the like. The EV may inform the charger of the physical limits of the EV through the ChargeParameterDiscoveryReq message. The ChargeParameterDiscoveryReq message may also provide, in percentage terms, an energy amount requested by the EV (i.e., EV Energy Request), an energy amount expected when fully charged (i.e., Full SOC), an energy amount expected at a requested charging end time (i.e., Bulk SOC), or the like.

Referring to FIGS. 4A and 4B again, the SECC 200 receiving the ChargeParameterDiscoveryReq message may transmit information such as a power output start time of the charger, a maximum output power of the charger, a billing start time, a price level of the charger, and the like through a 'ChargeParameterDiscoveryRes' message 4000 to the EVCC 100 so that the EV can perform the charge scheduling based on the information.

Then, the EVCC 100 may transmit a 'PowerDeliveryReq' message to the SECC 200 and receive a 'PowerDeliveryRes' message in response thereto.

Even with this charging process, a charging station having only one charging pad connected to one charger may have no problem in charge scheduling of the EV based on the information indicating the maximum output power and charging fee of the charger.

However, in the case that a charger having a plurality of charging pads is used in a charging station having a limited power supply capacity, since power outputs of the pads cannot exceed a maximum power output of the charger, there may be a difference between an actual charging completion time and a charging completion time calculated by the EV using only the information indicating the total output of the charger. Also, if there is no available power due to the limitation of the power supply capacity, it may be necessary to perform scheduling by reflecting the charging completion times of other vehicles.

In order to solve the above problems, embodiments of the present disclosure propose a method of transferring information indicating a maximum output power and charge fee of each charging pad to an EV.

Figure 5A:
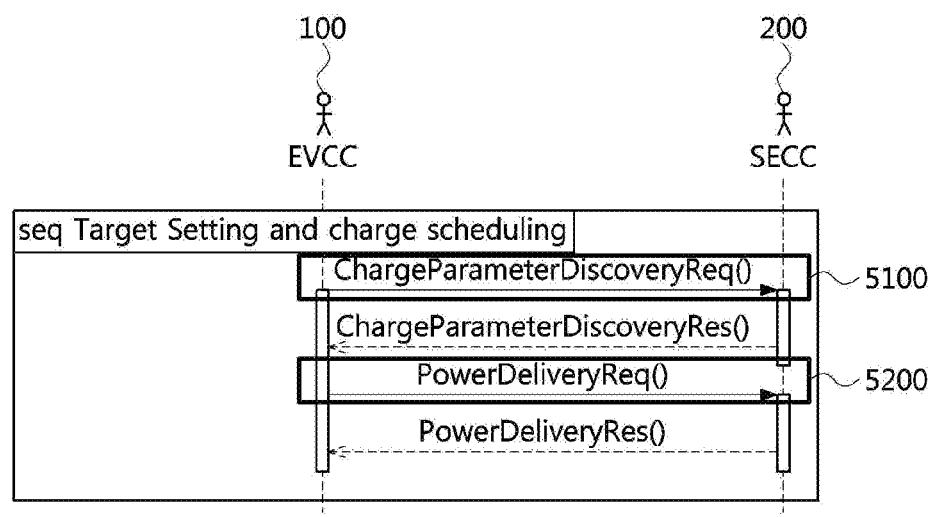
FIGS. 5A and 5B are diagrams illustrating an EV charging scheduling message according to embodiments of the present disclosure.
Figure 5B:
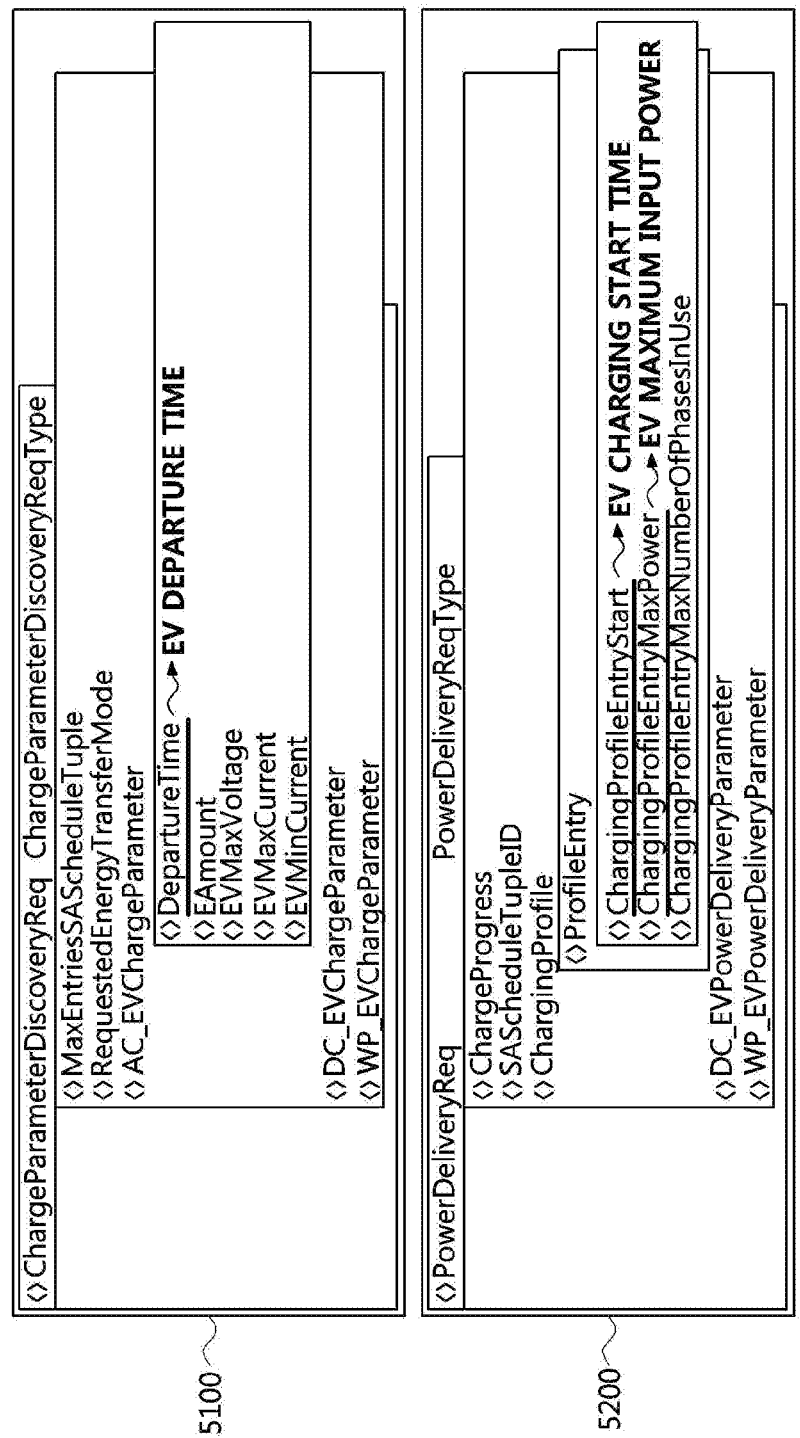

FIGS. 5A and 5B are diagrams illustrating messages for an EV charging scheduling according to embodiments of the present disclosure.

According to embodiments of the present disclosure FIGS. 5A and 5B, an EVCC 100 of an EV entering a charging station may provide information indicating a departure time of the EV to a charger through the ChargeParameterDiscoveryReq message (S510). The EVCC 100 of the EV may also provide charging scheduling information to the charger through the PowerDeliveryReq message, including an EV charging start time and a maximum input power of the EV (S520). Then, an SECC 200 of the charger may manage and update maximum output powers varying with time of all the charging pads connected to the charger based on the information indicating the departure time and charging scheduling information of the EV. In addition, the charger (or SECC) may provide the basic information of the charging pads to other EVs by including the maximum output power that varies with time for each charging pad.

Figure 6A:
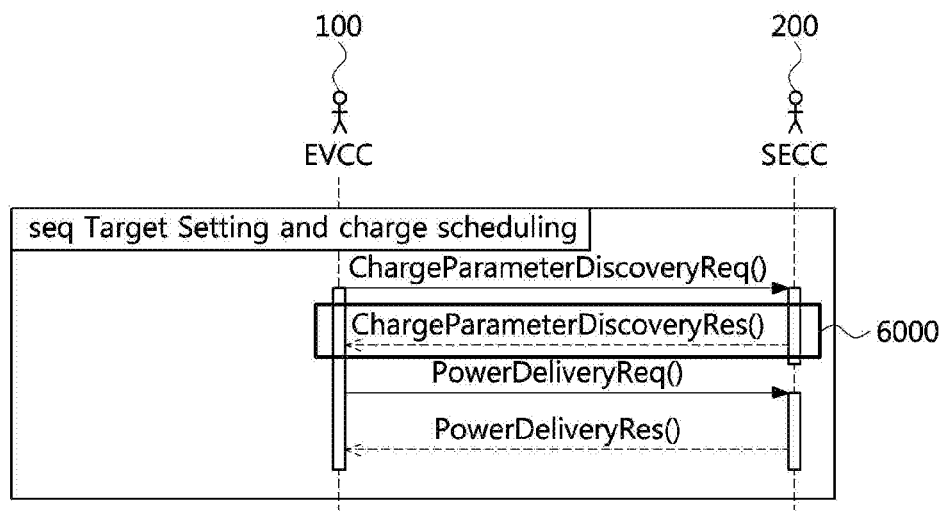
FIGS. 6A and 6B are diagrams illustrating information indicating a maximum output power and a charging fee of a charging pad according to embodiments of the present disclosure.
Figure 6B:
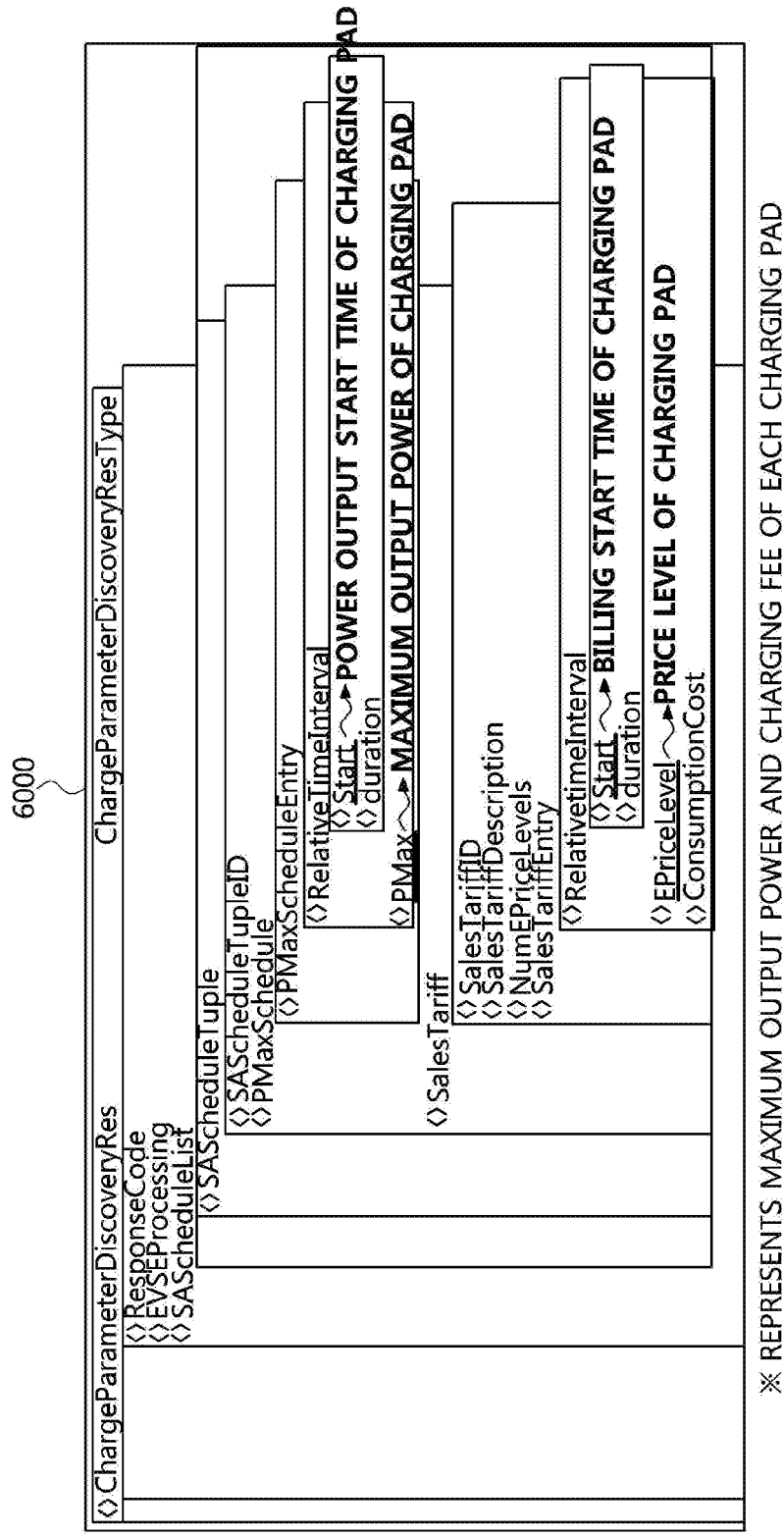

FIGS. 6A and 6B are diagrams illustrating information indicating a maximum output power and a charging fee of a charging pad according to embodiments of the present disclosure.

As shown in FIGS. 6A and 6B, when a new EV enters a charging station, a SECC 200 of a charger may provide basic information for each charging pad to the new EV (S610). Here, the basic information for each charging pad may include information indicating a maximum output power and a charging fee of each charging pad. More specifically, the basic information for each charging pad may include information such as a power output start time of each charging pad, a maximum output power of each charging pad, a billing start time of each charging pad, and a price level of each charging pad.

The EV 100 having received the charging-related information for each charging pad may perform scheduling of charging by predicting a time required for charging based on the received information, perform charging scheduling, and transmit the charging scheduling information of the EV 100 to the charger 200.

Meanwhile, according to embodiments of the present disclosure, when there is an EV waiting for charging because there is no available power, the charger may notify the EV waiting for charging at the time when the power for charging is available, so that a renegotiation for the charging can be started.

Figure 7:
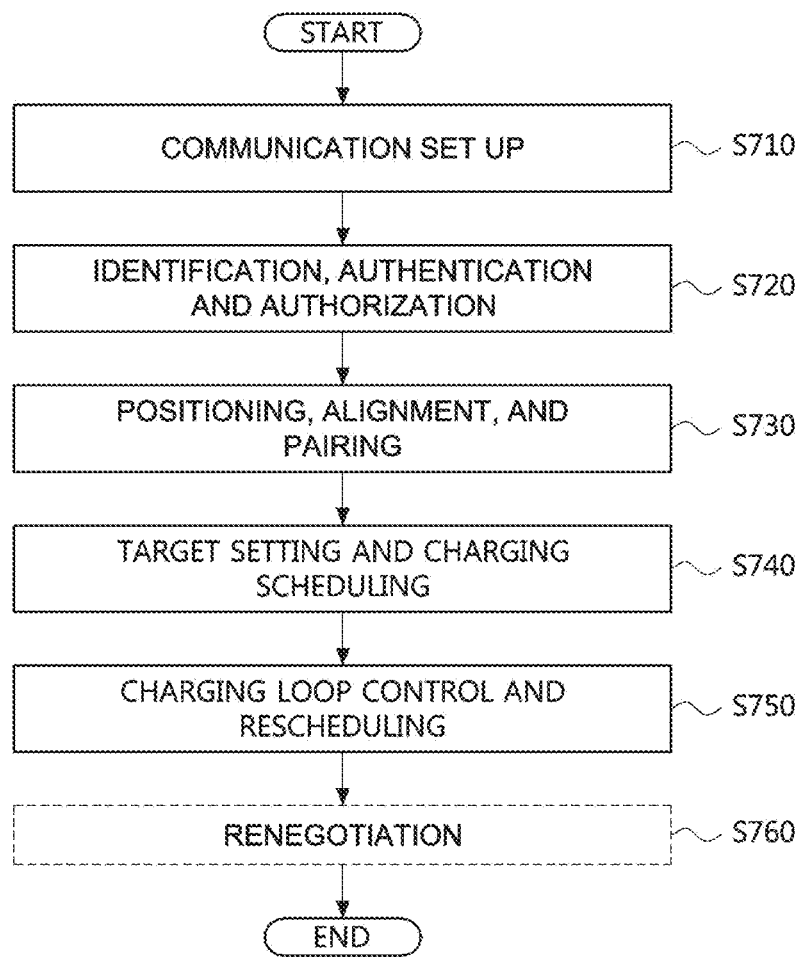
FIG. 7 is a flow chart illustrating a wireless charging control method performed between an EV and a charger according to embodiments of the present disclosure.

FIG. 7 is a flow chart illustrating a wireless charging control method performed between an EV and a charger according to embodiments of the present disclosure.

The example shown in FIG. 7 may illustrate a message exchange flow between an EV and a charger based on the ISO 15118 based wireless charging messages.

In order to exchange messages between the EV and the charger, a communication setup procedure for exchanging messages may be performed first (S710). Then, a procedure for identification, authentication and authorization may be followed (S720). Here, a SECC of the charger may inform the EV of itself (i.e., the SECC may make the EV identify the SECC), and perform authentication to check whether the EV is allowed to be charged by the charger. In general, the SECC may impose a charging fee if the EV or the user of the EV provides a payment mechanism. For this, an EVCC of the EV may provide a contract certificate or the user of the EV may provide a credit card, a debit card, cash, or the like to the SECC.

Here, the basic information (i.e., the charging pad related information) of all the charging pads in the charging station according to the present disclosure may be transmitted to the EV in the identification, authentication, and authorization procedure.

Additionally, a positioning, alignment and pairing procedure for the EV may be performed (S730). In order for efficient wireless charging to be performed, fine positioning of the EV with respect to a charging pad of the charger, alignment of the transmission pad of the charger and a reception pad of the EV, and pairing therebetween are required.

The wireless charging method according to embodiments of the present disclosure may also comprise a target setting and charging scheduling procedure (S740) and a charging loop control and rescheduling procedure (S750). Also, the wireless charging control method according to an embodiment of the present disclosure may optionally include a renegotiation procedure (S760) for optimal charging.

In the example of FIG. 7, the respective procedures have been described as performed sequentially, but this is merely an example, and the respective procedures may be performed simultaneously or with their operation sequences changed, and one procedure may be included in another procedure.

Hereinafter, each of the procedures shown in FIG. 7 will be described in more detail with reference to FIGS. 8 to 11.

Figure 8:
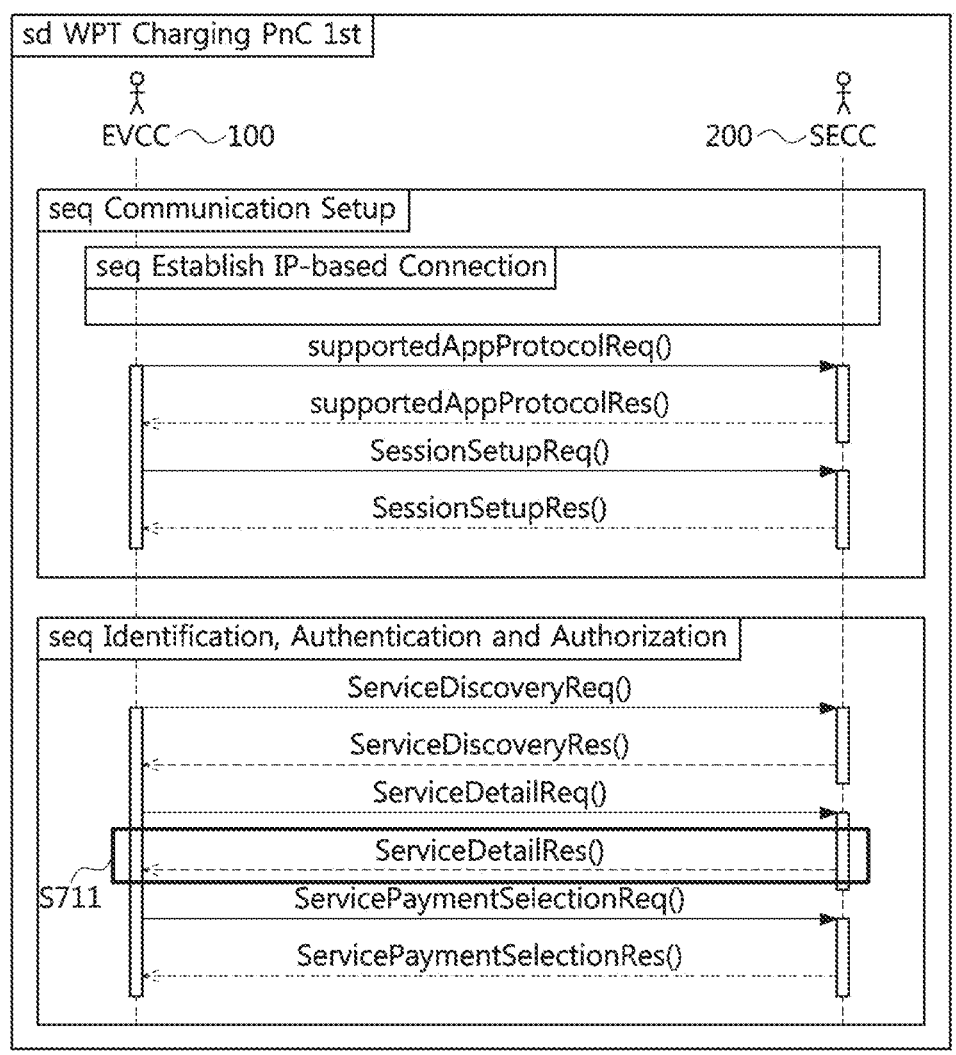
FIG. 8 is a diagram illustrating a message exchange flow when messages according to embodiments of the present disclosure are applied to ISO 15118 based messages.

FIG. 8 is a diagram illustrating a message exchange flow when messages according to embodiments of the present disclosure are applied to ISO 15118 based messages.

As shown in FIG. 8, the communication setup procedure (i.e., 'seq Communication Setup') for setting up communications between the EVCC 100 and the SECC may include a sequence (i.e., 'seq Establish IP-based Connection') for IP-based connection establishment. Here, the sequence for IP-based connection establishment may include a 'supportedAppProtocolReq' message, a 'supportedAppProtocolRes' message, a 'SessionSetupReq' message, and a 'SessionSetupRes' message.

Also, the procedure for identification, authentication and authorization (i.e., 'seq Identification, Authentication and Authorization') may include a 'ServiceDiscoveryReq' message, a 'ServiceDiscoveryRes' message, a 'ServiceDetailReq' message, a 'ServiceDetailRes' message, a 'ServicePaymentSelectionReq' message, and a 'ServicePaymentSelectionRes' message.

According to embodiments of the present disclosure, the basic information relating to the charging pad may be transmitted to the EVCC 100 as included in the ServiceDetailRes message based on the ISO 15118 (S711). Here, the ServiceDetailRes message is a message transmitted by the SECC 200 to the EVCC 100 in response to the ServiceDetailReq message received from the EVCC 100, and may include details of a selected wireless charging service. Also, the basic information relating to the charging pad may include information indicating a real-time maximum output power and a charging fee of each of the plurality of charging pads controlled by the charging station.

Figure 9:
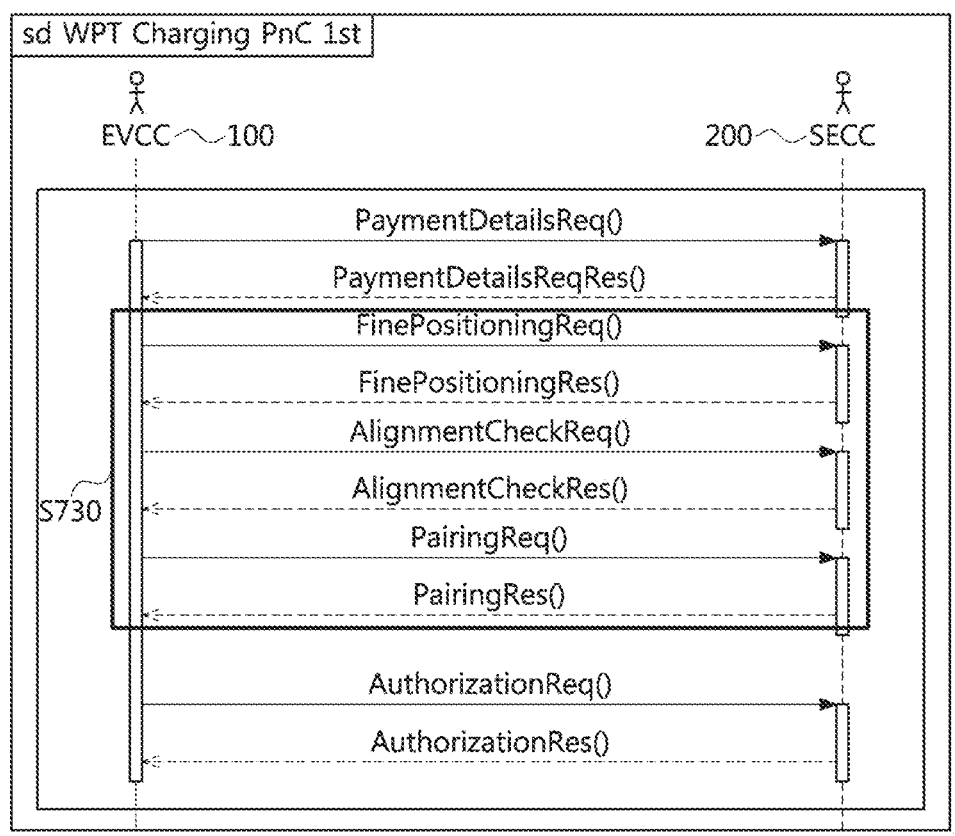
FIG. 9 is another diagram illustrating a message exchange flow when messages according to embodiments of the present disclosure are applied to ISO 15118 based messages.

FIG. 9 is another diagram illustrating a message exchange flow when messages according to embodiments of the present disclosure are applied to ISO 15118 based messages.

As shown in FIG. 9, in order to perform alignment and pairing between the pads of the EV and the charger, a 'FinePositioningReq' message, a 'FinePositioningRes' message, an 'AlignmentCheckReq' message, an 'AlignmentCheckRes' message, a 'PairingReq' message, and a 'PairingRes' message may be exchanged between the EVCC 100 and the SECC 200.

The FinePositioningReq message and the FinePositioningRes message may be used to initiate and stop a position adjustment procedure, which may include data required for calculating offsets of the charger and the EV according to a positioning scheme used.

The AlignmentCheckReq message and the AlignmentCheckRes message may be messages exchanged between the EV and the charger to determine whether the alignment between the transmission pad of the charger and the reception pad of the EV is suitable for power transmission.

The PairingReq message and the PairingRes message may be a pair of messages used to perform a pairing procedure between the transmission pad and the reception pad, and the EVCC 100 may inform the SECC 20 that the EVCC 100 desires to start the pairing procedure by transmitting the PairingReq message to the SECC 200.

Figure 10:
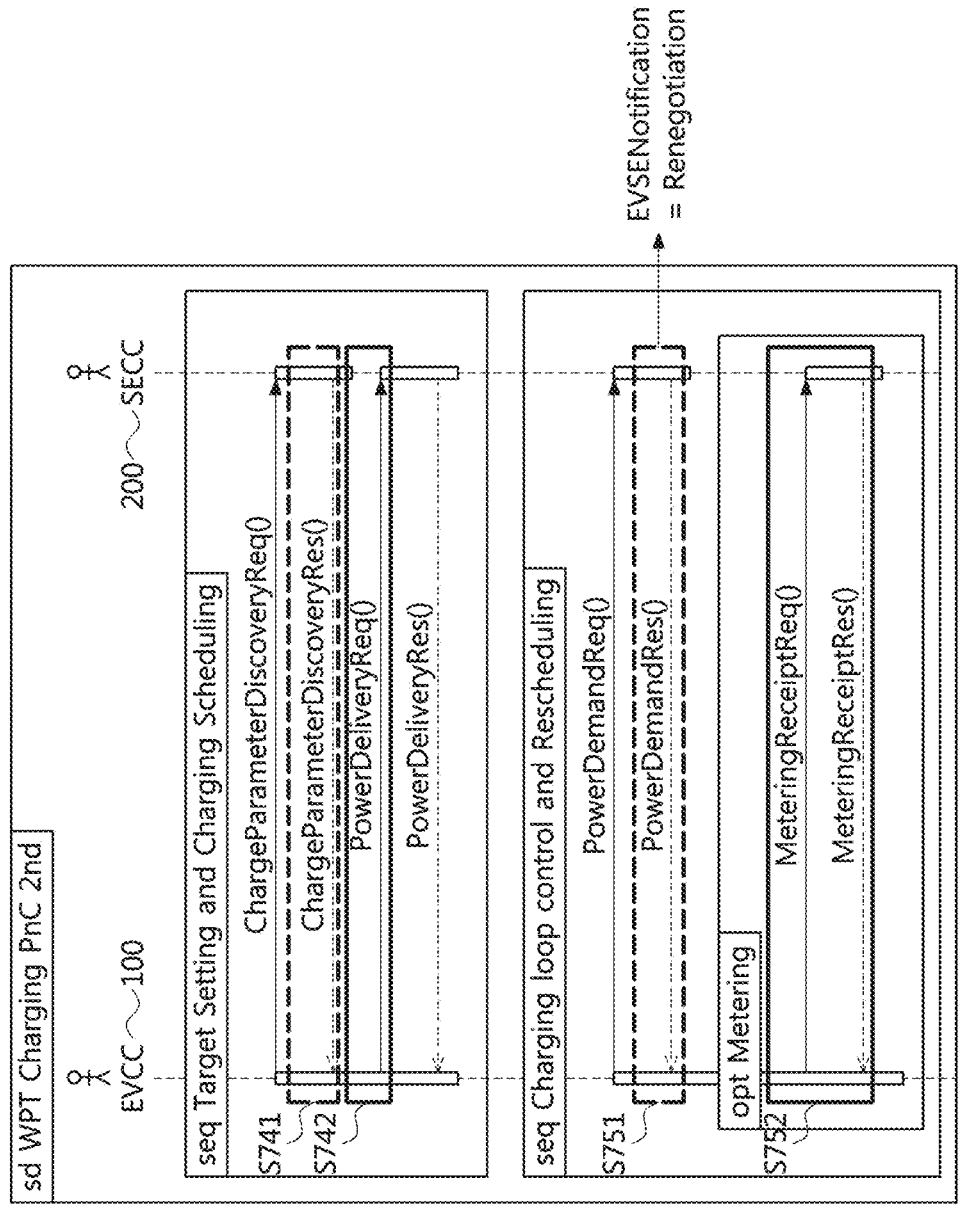
FIG. 10 is yet another diagram illustrating a message exchange flow when messages according to embodiments of the present disclosure are applied to ISO 15118 based messages.

FIG. 10 is yet another diagram illustrating a message exchange flow when messages according to embodiments of the present disclosure are applied to ISO 15118 based messages.

As shown in FIG. 10, a procedure for setting a target and performing charging scheduling (i.e., 'seq target setting and charging scheduling'), and a procedure for controlling a charging loop and performing rescheduling (i.e., 'seq charging loop control and rescheduling') are illustrated.

In the procedure for setting a target and performing charging scheduling, the SECC 200 and the EVCC 100 may exchange information indicating a WPT limit using high-level communications. The SECC 200 may transmit information indicating the maximum power that can be transferred through the WPT to the EVCC 100.

Referring still to FIG. 10, the target setting and charging scheduling procedure may include a step S741 in which the SECC 200 transmits information indicating the real-time maximum output and the charging fee of each charging pad to the EVCC 100, and a step S742 in which the EVCC 100 transmits scheduling information (i.e., "EV charging scheduling information") of the EV to the SECC 200.

Here, the information indicating the real-time maximum output and charging fee of the charging pad may be transmitted to the EVCC 100 as included in the ChargeParameterDiscoveryRes message. Through the ChargeParameterDiscoveryRes message, the SECC 200 may provide information indicating applicable charging parameters on the grid side. The ChargeParameterDiscoveryRes message may contain information indicating price per hour, price per requirement, or price per consumption as well as the basic charging parameters.

Also, the scheduling information may be transmitted from the EVCC 100 to the SECC 200 as included in the PowerDeliveryReq message. The exchange of the PowerDelivery messages may specify a time point at which the SECC 200 starts to supply power and accordingly the battery of the EV begins to be charged. The EVCC 100 may request the SECC 200 to supply power by transmitting the PowerDeliveryReq message.

Meanwhile, a renegotiation request may occur while the wireless charging is performed. The charging loop control and rescheduling procedure illustrated in FIG. 10 may be a procedure in which the SECC 200 requests a renegotiation to the EVCC 100 (i.e., an EVSENotification element in a PowerDemandRes message is set to 'Renegotiation') when a surplus power becomes available while performing wireless charging.

Referring to FIG. 10 once again, the EV requests a specific power to the SECC by transmitting a PowerDemandReq message to the SECC 200 during charging. Upon receipt of the PowerDemandReq message, the SECC 200 may transmit a PowerDemandRes message to the corresponding EV informing an EVSE status. For example, the SECC 200 may request a renegotiation by transmitting the PowerDemandRes message to the EVCC 100, a value of the EVSENotification element included in the PowerDemandRes message being set to 'Renegotiation' (S751). The EVSENotification is an element for the SECC to control the operation of the EVCC and may include information indicating the operation the SECC wishes the EVCC to perform.

Meanwhile, MeteringRecceipt messages for calculating the charging fee up to the present may be exchanged between the SECC 200 and the EVCC 100.

Figure 11:
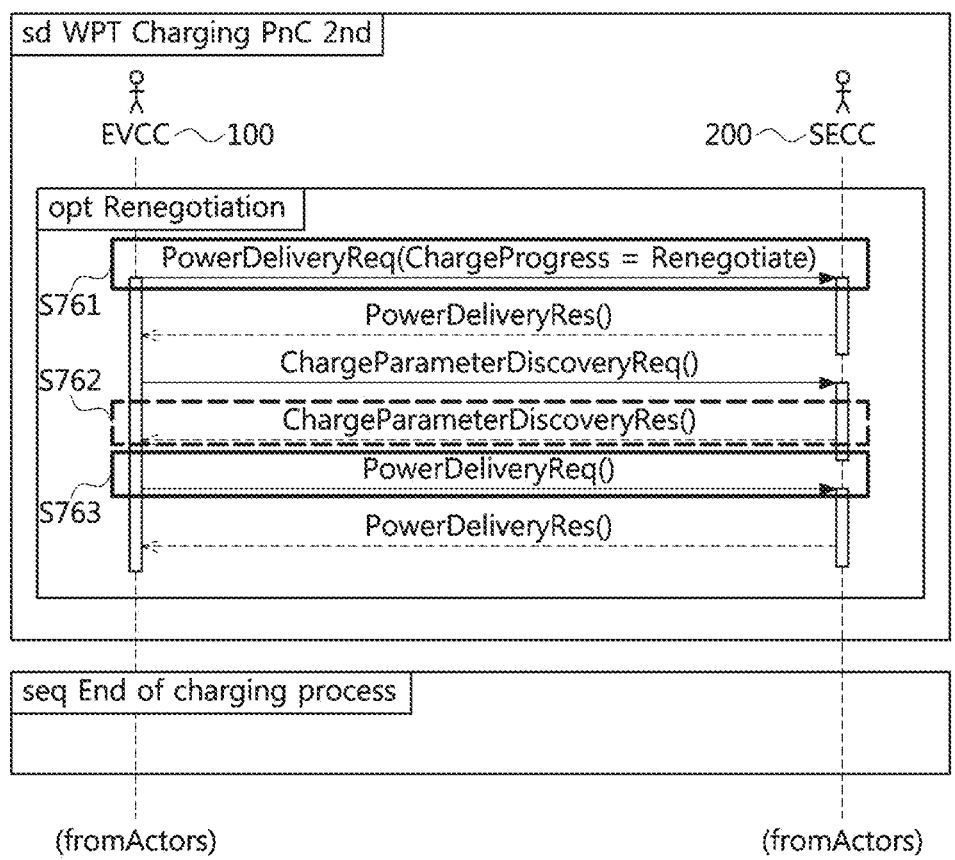
FIG. 11 is yet another diagram illustrating a message exchange flow when messages according to embodiments of the present disclosure are applied to ISO 15118 based messages.

FIG. 11 is yet another diagram illustrating a message exchange flow when messages according to embodiments of the present disclosure are applied to ISO 15118 based messages;

As shown in FIG. 11, the EVCC 100 may notify the SECC 200 of the completion of the charging through a PowerDeliveryReq message (e.g., a ChargeProgress element in the PowerDeliveryReq message is set to 'Renegotiation') (S761). In addition, the SECC 200 receiving a ChargeParameterDiscoveryReq message from the EVCC 100 may transmit updated information indicating a real-time maximum output power and a charging fee of the charging pad to the EVCC 100 through a ChargeParameterDiscoveryRes message (S762). The EVCC 100 may transmit the EV charge scheduling information to the SECC 200 through a PowerDeliveryReq message (S763).

FIGS. 12A to 12E are diagrams illustrating information indicating output powers of a charger and respective charging pads based on EV scheduling information according to embodiments of the present disclosure.

Figure 12A:
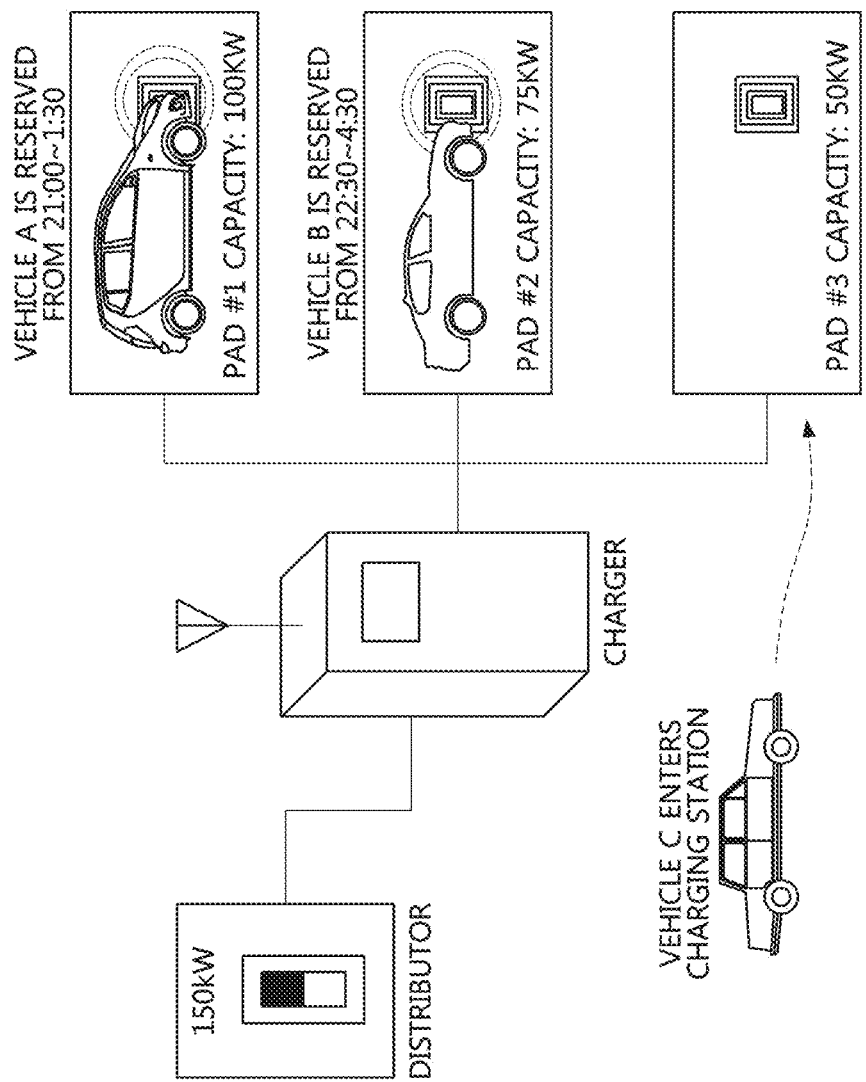
FIGS. 12A to 12E are diagrams illustrating information indicating output powers of a charger and respective charging pads based on EV scheduling information according to embodiments of the present disclosure.

Referring first to FIG. 12A, first to third pads are connected to a charger of a charging station connected to a 150 kW distributor. It is assumed that the capacity of the first pad is 100 kW and a charging is reserved for an already-entered vehicle A from 21:00 to 01:30. Also, it is assumed that the capacity of the second pad is 75 kW and a charging is reserved for an already-entered vehicle B from 22:30 to 04:30.

Figure 12B:
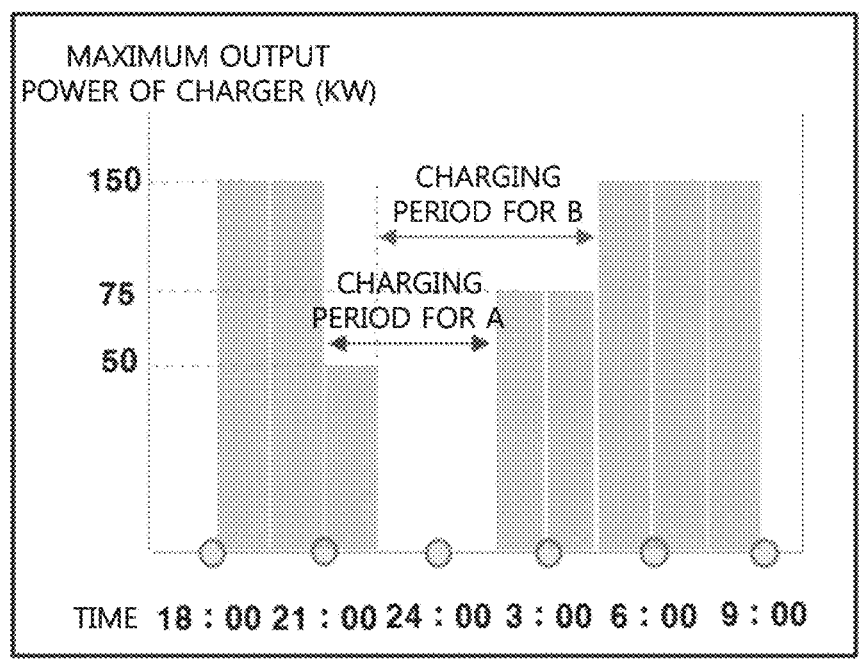

Next, FIG. 12B illustrates the maximum output power of the charger with time, which indicates that the maximum output power of the charger may be influenced by the charging of the vehicle A and the charging of the vehicle B. From the viewpoint of the entire charger, the charger can output 50 kW from 21:00 to 22:30, which is the period in which the vehicle A is solely charged, and can output 0 kW from 22:30 to 01:30, which is the period in which the vehicle A and the vehicle B both are charged. Also, the charger can output 75 kW from 01:30 to 04:30, which is the period in which the vehicle B is solely charged, and can output 150 kW according to the output of the distributor in other periods excluding the periods in which the vehicle A and/or the vehicle B are charged.

Figure 12C:
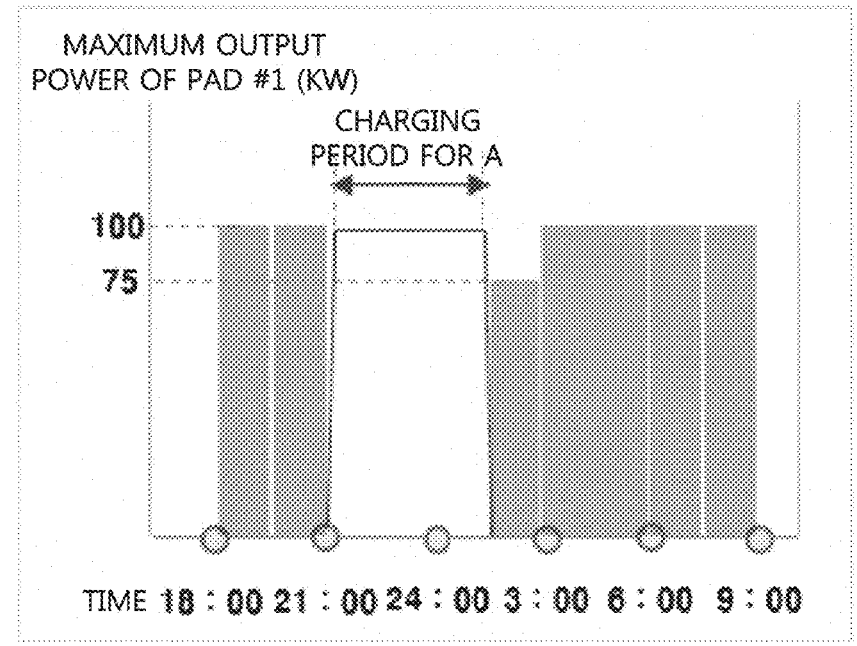
Figure 12D:
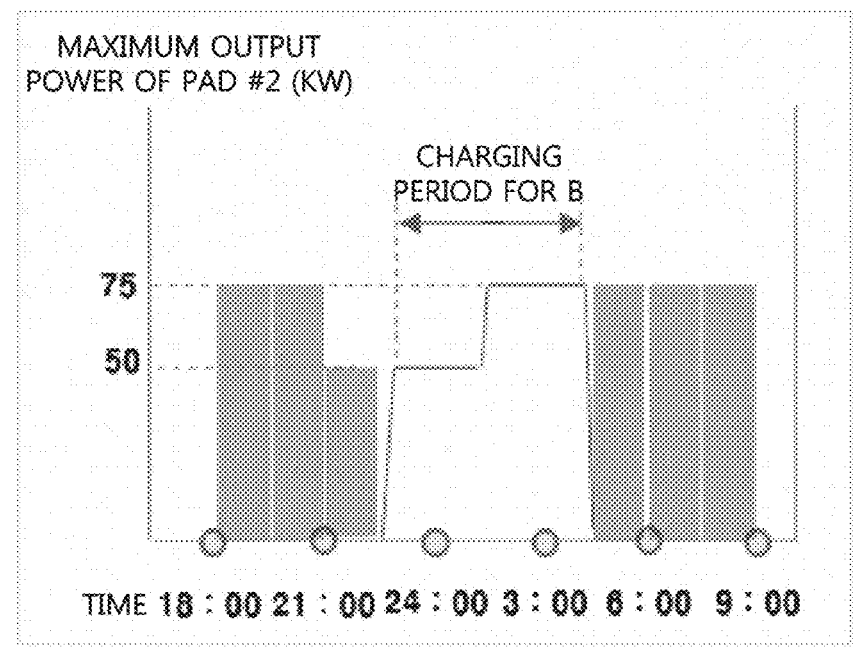

Referring next to FIGS. 12C and 12D, the maximum output power of the first pad by the vehicle A over time is illustrated in FIG. 12C, and the maximum output power of the second pad by the vehicle B over time is illustrated in FIG. 12D.

As shown in FIG. 12C, the first pad can output 0 kW from 21:00 to 01:30 which is the charging period of the vehicle A, output 75 kW from 01:30 to 03:00, and output 100 kW which is the total capacity of the first pad in other periods.

As shown in FIG. 12D, the second pad can output 0 kW from 22:30 to 04:30 which is the charging period of the vehicle B, output 50 kW from 21:00 to 22:30, and output 75 kW which is the capacity of the second pad in other periods.

Figure 12E:
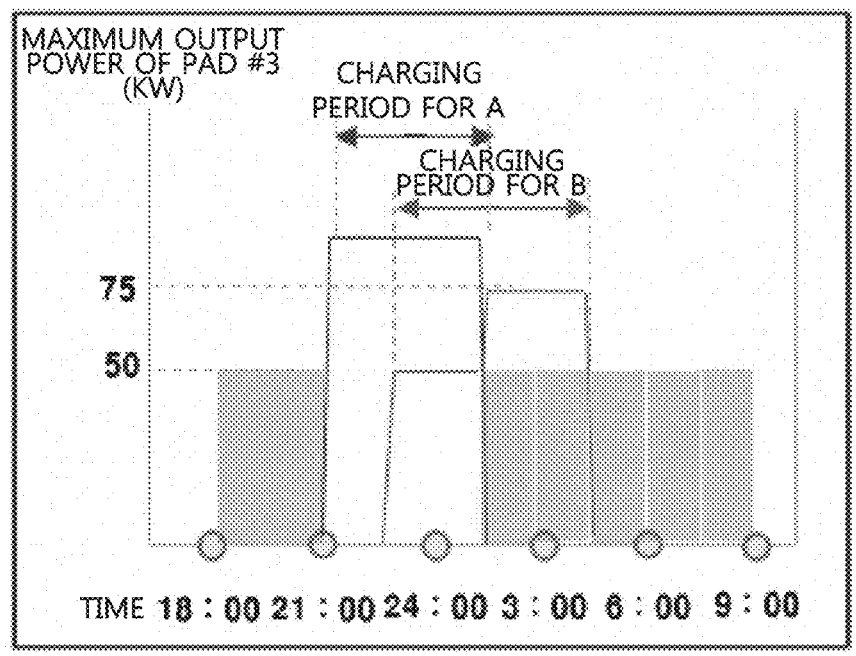

FIG. 12E illustrates the maximum output power of the third pad by the vehicle C over time when the vehicle C enters the third pad having a capacity of 50 kW. As shown in FIG. 12E, the third pad can output 0 kW from 21:00 to 01:30 and output 50 kW which is the capacity of the third pad in other periods. Therefore, the vehicle C can perform charging in a time period from 18:00 to 21:00, and a time period after 01:30.

According to the embodiments of the present disclosure, as shown in FIG. 12E, it is made possible to manage information indicating the outputs of all the charging pads in the charging station, thereby enabling efficient charge scheduling.

Figure 13:
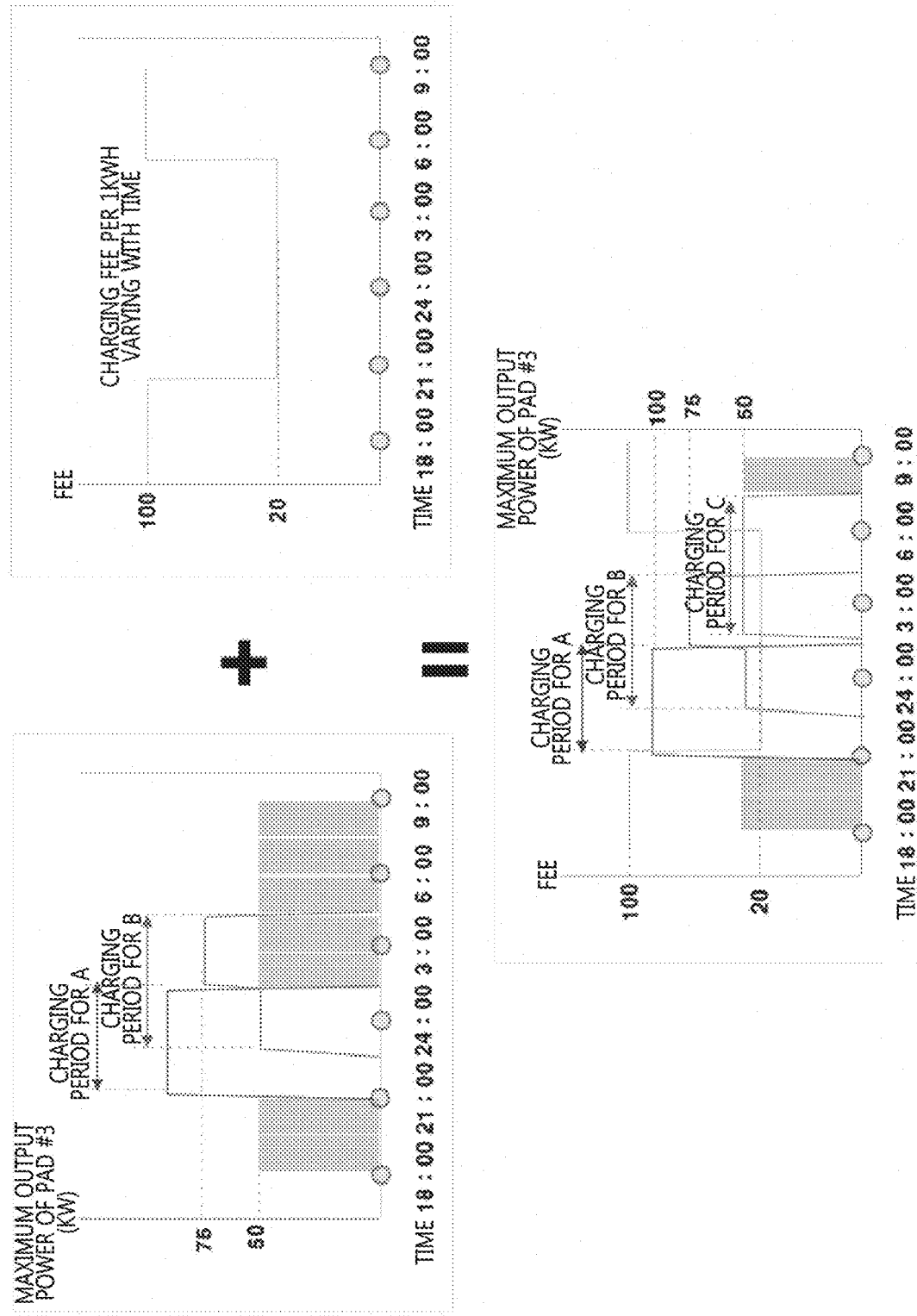
FIG. 13 is a diagram illustrating a charging scheduling method based on charging pad output power and charging fee according to embodiments of the present disclosure.

FIG. 13 is a diagram illustrating a charging scheduling method based on charging pad output power and charging fee according to embodiments of the present disclosure.

As shown in FIG. 13, illustrated is a charging scheduling method that considers charging fee variation in addition to the information indicating an output power of each charging pad shown in FIGS. 12A to 12E.

A charging period for the vehicle C may be scheduled considering the maximum output power and the charging fee variation with time of the third pad. In the example shown in FIGS. 12A to 12E, it can be seen that the vehicle C can perform charging in a time period from 18:00 to 21:00 and a time period after 01:30. Under such the condition, when the charging fee variation with time is taken into consideration, it may be most preferable to perform charging in a time period from 21:00 to 06:00 in terms of economy.

Therefore, the charging period for the vehicle C, which considers the maximum output power of the third pad and the charging fee variation with time, may be scheduled from 01:30 to 07:30. Accordingly, a fee of 20 won (about 2 cents) per 1 kWh may be charged from 1:30 to 06:00, and a fee of 100 won (about 10 cents) per 1 kWh may be charged from 06:00 to 07:30.

Figure 14:
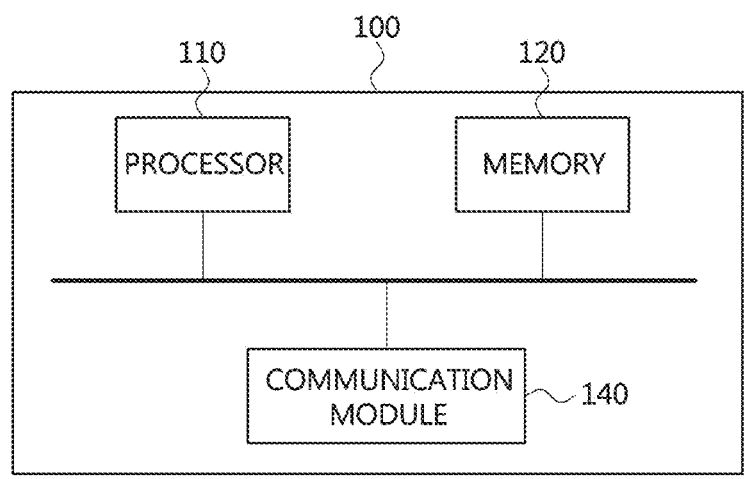
FIG. 14 is a block diagram illustrating a charging control apparatus in an EV according to embodiments of the present disclosure.

FIG. 14 is a block diagram illustrating a charging control apparatus in an EV according to embodiments of the present disclosure.

As shown in FIG. 14, a charging control apparatus 100 according to an embodiment of the present disclosure may be disposed at an EV receiving power from a power supply apparatus including at least one charging pad, and may control wireless charging of the EV.

The charging control apparatus 100 may comprise at least one processor 110 and a memory 120 storing at least one instruction to be executed by the at least one processor 110.

The at least one instruction is configured for the at least one processor 110 to perform to set up a communication link with a power supply apparatus; receive basic information relating to the at least one charging pad from the power supply apparatus; provide information indicating a departure time when an EV leaves a charging station to the power supply apparatus; receive at least one of information indicating an output power of the at least one charging pad and information indicating a charging fee of the at least one charging pad from the power supply apparatus; perform scheduling for wireless charging of the EV by using at least one of the information indicating the output power and the information indicating the charging fee; and provide scheduling information to the power supply apparatus.

The power supply apparatus 100 may also include a communication module 140. The communication module 140 is a module for performing communications with the charging station side, and may exchange messages with the charging station side based on the ISO 15118 standard.

Here, the basic information relating to the at least one charging pad may be received as included in the ServiceDetailRes message. Also, at least one of the information indicating the output power and the information indicating the charging fee may be received as included in the ChargeParameterDiscoveryRes message.

The information indicating the output power and the information indicating the charging fee may include at least one of a power output start time point of each charging pad, a maximum output power of each charging pad, a billing start time of each charging pad, and a price level of each charging pad.

Meanwhile, the scheduling information for the EV may be transmitted as included in the PowerDeliveryReq message. The scheduling information may also include at least one a charging start time of the EV, a maximum input power of the EV, and a charging end time of the EV. The information indicating the departure time of the EV may be transmitted as included in the ChargeParameterDiscoveryReq message. The renegotiation request message may be transmitted as included in the PowerDeliveryRes message.

Figure 15:
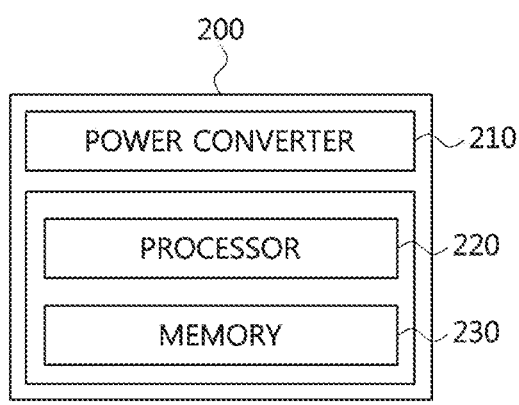
FIG. 15 is a block diagram illustrating a power supply apparatus according to embodiments of the present disclosure.

FIG. 15 is a block diagram illustrating a power supply apparatus according to embodiments of the present disclosure.

As shown in FIG. 15, a power supply apparatus 200 may comprise a power converter 210, at least one processor 220, and a memory 230.

The power converter 210 may interoperate with the transmission pad (i.e., charging pad) for WPT, convert a voltage input under the control of the at least one processor 220, and output the converted voltage to the reception pad of the EV through the transmission pad.

The memory 230 may store at least one instruction to be executed by the at least one processor 220, and the at least one instruction is configured for the at least one processor 220 to perform to set up a communication link with an EV; provide basic information relating to at least one charging pad to the EV; receive information indicating a departure time when the EV leaves a charging station; transmit at least one of information indicating an output power of the at least one charging pad and information indicating a charging fee of the at least one charging pad to the EV; receive scheduling information of the EV from the EV; and supply power to the EV according to the scheduling information.

The power supply apparatus 100 may also include a communication module (not shown). The communication module may exchange messages with the EV based on the ISO 15118 standard.

Here, the basic information relating to the at least one charging pad may be transmitted as included in the ServiceDetailRes message. Also, at least one of the information indicating the output power and the information indicating the charging fee may be transmitted as included in the ChargeParameterDiscoveryRes message.

Here, the information indicating the output power and the information indicating the charging fee may include at least one of a power output start time point of each charging pad, a maximum output power of each charging pad, a billing start time of each charging pad, and a price level of each charging pad.

Meanwhile, the scheduling information for the EV may be received as included in the PowerDeliveryReq message. The scheduling information may also include at least one a charging start time of the EV, a maximum input power of the EV, and a charging end time point of the EV. The information indicating the departure time of the EV may be received as included in the ChargeParameterDiscoveryReq message. The renegotiation request message may be received as included in the PowerDeliveryRes message.

According to the embodiments of the present disclosure, it is possible to perform wireless charge scheduling for the EV based on the output powers of all the charging pads over time in a charging station with a limited power supply capacity. It is further possible to guarantee interoperability between the charging pad and the EV when another EV leaves the charging station. The embodiments of the present disclosure can be implemented in a charger capable of communicating with an EV, and can be implemented in an EV and a charger in which a WPT system is built. Also, the embodiments can be implemented in a vehicle capable of charge scheduling.

Various embodiments of the present disclosure are not limited to the wireless charging and may also be applied to the conductive-type charging process even if the wireless charging is described in the embodiments described above. In this case, the EV and the charging station may be connected to each other by a charging cable, and wireless communications using the wireless communication module between them may be performed in the same manner.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa. While some aspects of the present disclosure have been described in the context of an apparatus, it may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a programmable computer, or an electronic circuit. In various exemplary embodiments, one or more of the most important method steps may be performed by such an apparatus.

In embodiments, a programmable logic device (e.g., a field programmable gate array (FPGA)) may be used to perform some or all of the functions of the methods described herein. In embodiments, the FPGA may operate in conjunction with a microprocessor to perform one of the methods described herein. Generally, the methods are preferably performed by some hardware device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific \embodiments of the present disclosure have been presented for purposes of illustration and description. They are not intended to be exhaustive or to limit the disclosure to the precise forms disclosed, and obviously many modifications and variations are possible in light of the above teachings. The embodiments were chosen and described to explain certain principles of the disclosure and their practical application, to enable others skilled in the art to make and utilize various embodiments of the present disclosure, as well as various alternatives and modifications thereof. It is intended that the scope of the disclosure be defined by the claims appended hereto and their equivalents.

What is claimed is:

1. A wireless charging control method performed by a power supply apparatus including at least one charging pad configured to supply power wirelessly to an electric vehicle (EV), the wireless charging control method comprising:
    initializing a communication link with the EV;
    transmitting information relating to the at least one charging pad to the EV;
    receiving information indicating a departure time when the EV leaves a charging station;
    transmitting at least one of information indicating an output power of the at least one charging pad and information indicating a charging fee of the at least one charging pad;
    receiving scheduling information of the EV from the EV; and
    supplying power wirelessly to the EV through the at least one charging pad according to the scheduling information.

2. The wireless charging control method according to claim 1, wherein the EV and the power supply apparatus exchange wireless charging related messages according to International Organization for Standardization (ISO) 15118.

3. The wireless charging control method according to claim 2, wherein the information relating to the at least one charging pad is included in a ServiceDetailRes message transmitted to the EV.

4. The wireless charging control method according to claim 2, wherein at least one of the information indicating the output power and the information indicating the charging fee is included in a ChargeParameterDiscoveryRes message.

5. The wireless charging control method according to claim 4, wherein the information indicating the output power or the information indicating the charging fee includes an indication of at least one of a power output start time, a maximum output power, a billing start time, and a price level of each of the at least one charging pad.

6. The wireless charging control method according to claim 2, wherein the scheduling information is included in a PowerDeliveryReq message received from the EV.

7. The wireless charging control method according to claim 1, wherein the scheduling information includes an indication of at least one of a charging start time, a maximum input power, and a charging end time of the EV.

8. The wireless charging control method according to claim 1, further comprising performing a procedure for alignment and pairing between a reception pad of the EV and the at least one charging pad to perform wireless power transfer to the EV.

9. The wireless charging control method according to claim 2, wherein the information indicating the departure time is included in a ChargeParameterDiscoveryReq message.

10. The wireless charging control method according to claim 1, further comprising transmitting a renegotiation request to the EV when a surplus power of the power supply apparatus becomes available during the supplying of the power to the EV.

11. The wireless charging control method according to claim 10, wherein the renegotiation request is included in a PowerDeliveryRes message transmitted by the power supply apparatus.

12. A wireless charging control method performed by an electric vehicle (EV) configured to receive power wirelessly from a power supply apparatus including at least one charging pad, the wireless charging control method comprising:
    initializing a communication link with the power supply apparatus;
    receiving information relating to the at least one charging pad from the power supply apparatus;
    transmitting information indicating a departure time when the EV leaves a charging station;
    receiving at least one of information indicating an output power of the at least one charging pad and information indicating a charging fee of the at least one charging pad from the power supply apparatus;
    performing a scheduling operation using at least one of the information indicating the output power and the information indicating the charging fee;
    transmitting scheduling information to the power supply apparatus; and
    receiving power wirelessly from the at least one charging pad according to the scheduling information.

13. The wireless charging control method according to claim 12, wherein the EV and the power supply apparatus exchange wireless charging related messages according to International Organization for Standardization (ISO) 15118.

14. The wireless charging control method according to claim 13, wherein the information relating to the at least one charging pad is included in a ServiceDetailRes message received from the power supply apparatus.

15. The wireless charging control method according to claim 13, wherein at least one of the information indicating the output power and the information indicating the charging fee is included in a ChargeParameterDiscoveryRes message received from the power supply apparatus.

16. The wireless charging control method according to claim 13, wherein the scheduling information is included in a PowerDeliveryReq message transmitted to the power supply apparatus.

17. A power supply apparatus including at least one charging pad configured to supply power wirelessly to an electric vehicle (EV), at least one processor, and a memory storing at least one instruction executable by the at least one processor, which when executed cause the at least one processor to:
    initialize a communication link with the power supply apparatus;
    transmit information relating to the at least one charging pad to the EV;
    receive information indicating a departure time when the EV leaves a charging station;
    transmit at least one of information indicating an output power of the at least one charging pad and information indicating a charging fee of the at least one charging pad;
    receive scheduling information of the EV from the EV; and
    supply power wirelessly to the EV through the at least one charging pad according to the scheduling information.

18. The power supply apparatus according to claim 17, wherein the EV and the power supply apparatus exchange wireless charging related messages according to International Organization for Standardization (ISO) 15118.

19. The power supply apparatus according to claim 18 wherein the information relating to the at least one charging pad is included in a ServiceDetailRes message transmitted to the EV.

20. The power supply apparatus according to claim 18, wherein at least one of the information indicating the output power and the information indicating the charging fee is included in a ChargeParameterDiscoveryRes message.

* * * * *